US009906616B2

(12) United States Patent
Sharma et al.

(10) Patent No.: US 9,906,616 B2
(45) Date of Patent: *Feb. 27, 2018

(54) SYSTEMS AND METHODS FOR MULTI-LINE, MULTI-DEVICE SERVICE IN A COMMUNICATIONS NETWORK

(71) Applicant: MAVENIR SYSTEMS, INC., Richardson, TX (US)

(72) Inventors: Anish Sharma, Richardson, TX (US); Michael Brett Wallis, McKinney, TX (US); Bejoy Pankajakshan, Allen, TX (US)

(73) Assignee: MAVENIR SYSTEMS, INC., Richardson, TX (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/992,791

(22) Filed: Jan. 11, 2016

(65) Prior Publication Data

US 2016/0352855 A1 Dec. 1, 2016

Related U.S. Application Data

(60) Provisional application No. 62/230,318, filed on Jun. 1, 2015.

(51) Int. Cl.
| | | |
|---|---|---|
| *G06F 17/30* | (2006.01) | |
| *G06F 3/0484* | (2013.01) | |
| *G06F 3/0482* | (2013.01) | |
| *H04W 76/02* | (2009.01) | |
| *H04W 60/04* | (2009.01) | |
| *H04L 29/08* | (2006.01) | |
| *H04W 48/08* | (2009.01) | |
| *H04L 29/06* | (2006.01) | |

(52) U.S. Cl.
CPC ........ *H04L 67/2838* (2013.01); *G06F 3/0482* (2013.01); *G06F 3/04842* (2013.01); *G06F 17/30377* (2013.01); *H04L 65/1016* (2013.01); *H04L 65/1073* (2013.01); *H04W 48/08* (2013.01); *H04W 60/04* (2013.01); *H04W 76/025* (2013.01)

(58) Field of Classification Search
CPC ............... G06F 3/0482; G06F 3/04842; G06F 17/30377; H04L 67/2838; H04L 65/1073; H04L 65/1016; H04W 60/04; H04W 76/025; H04W 48/08
See application file for complete search history.

(56) References Cited

U.S. PATENT DOCUMENTS

| 8,369,313 B2 | 2/2013 | Lu et al. |
| 2004/0230697 A1 | 11/2004 | Kiss et al. |

(Continued)

OTHER PUBLICATIONS

Soroushinejad M et al"Implementing Multiple Line Appearances Using the Session Initiation Protocol"; MPEG Meeting, 3/16-23/11, Geneva.

*Primary Examiner* — Brian D Nguyen
(74) *Attorney, Agent, or Firm* — Ohlandt, Greeley, Ruggiero & Perle, L.L.P.

(57) ABSTRACT

Communication systems and methods suitable for use with multiple lines associated with one or more devices are disclosed. Exemplary systems include a proxy service node to enable registration of multiple lines associated with a device. Exemplary systems can also include a converged database to store and provide access to service-related data.

20 Claims, 8 Drawing Sheets

(56) References Cited

U.S. PATENT DOCUMENTS

| | | | |
|---|---|---|---|
| 2007/0153776 A1* | 7/2007 | Joseph | H04L 29/06027 370/356 |
| 2008/0165942 A1* | 7/2008 | Provenzale | H04M 3/436 379/142.01 |
| 2009/0055899 A1 | 2/2009 | Deshpande et al. | |
| 2009/0191871 A1 | 7/2009 | Siegel et al. | |
| 2009/0280789 A1* | 11/2009 | Takuno | H04L 29/1216 455/418 |
| 2012/0095810 A1* | 4/2012 | Miao | G07C 13/00 705/12 |
| 2013/0132854 A1* | 5/2013 | Raleigh | G06F 3/0482 715/738 |
| 2016/0309320 A1* | 10/2016 | Piscopo, Jr. | H04W 8/06 |

* cited by examiner

SYSTEMS AND METHODS FOR MULTI-LINE, MULTI-DEVICE SERVICE IN A COMMUNICATIONS NETWORK

CROSS-REFERENCE TO RELATED APPLICATIONS

This application claims the benefit of U.S. Provisional Application No. 62/230,318, entitled MULTI-LINE MULTI-DEVICE SERVICE IN A COMMUNICATIONS NETWORK, and filed Jun. 1, 2015, the contents of which are incorporated herein by reference to the extent such contents do not conflict with the present disclosure.

FIELD

The present disclosure generally relates to communication systems and methods, and more particularly to communication systems and methods that allow for the use of multiple lines on one or more devices in a communications network.

BACKGROUND

Various mobile devices, also referred to herein a User Equipment (UE), can operate in wireless communication networks that provide high-speed data and/or voice communications. The wireless communication networks can implement circuit-switched (CS) and/or packet-switched (PS) communication protocols to provide various services. For example, a UE can operate in accordance with one or more radio technologies such as: Universal Terrestrial Radio Access (UTRA), Evolved UTRA (E-UTRA), and Global System for Mobile Communications (GSM) as part of a Universal Mobile Telecommunication System (UMTS). Descriptions and specifications for UTRA, E-UTRA, GSM, UMTS and LTE (Long Term Evolution) protocols are available from the Third Generation Partnership Project (3GPP), which is a partnership that united telecommunications standards development organizations and provides their members with an environment to produce reports and specifications that define 3GPP technologies.

Evolved Packet Core (EPC) technology was developed based on the 3GPP core network architecture. In EPC, the user data and the signaling data are separated into the user plane and the control plane to allow a network operator to easily adapt and scale their networks. At a high level, EPC architecture includes four basic network elements: the Serving Gateway (SGW), the Packet Data Network Gateway (PDN GW or PGW), the Mobility Management Entity (MME), and the Home Subscriber Server (HSS). The EPC can be connected to external networks, which can include an IP Multimedia Core Network Subsystem (IMS).

An IMS is generally configured to facilitate the use of Internet protocol (IP) for packet communications, such as telephony, facsimile, email, Internet access, Web Service, Voice over IP (VoIP), instant messaging (IM), videoconference sessions, video on demand (VoD), and the like, over wired and/or wireless communication networks.

As discussed in more detail below, typical communication networks generally provide a single line or number that is associated with a UE. Various users can have several devices, each with its own line. In some cases, a user may wish to use one or more lines with one or more devices and/or share a line with other users. While some Over The Top applications may provide an ability for a user to use a second line on a device, such applications generally do not allow for multiple lines to be used on multiple devices in an efficient and/or transparent manner. Accordingly, improved communications systems and methods are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. Further, it should be noted that while various components may be suitably coupled or connected to other components within exemplary systems, such connections and couplings can be realized by direct connection between components, or by connection through other components and devices located therebetween.

Various embodiments of the disclosure provide systems and methods for allowing users to use multiples lines on one or more devices. For example, a single device can be used to make and/or receive communications using two or more lines and/or multiple devices can use the same line, such that a communication to the line is sent to all of the devices using that line. This technology is generally referred to herein as multi-line, multi-device or MLMD technology.

As noted above, traditionally communication networks tie a number to a user and often to a device—i.e., devices are typically locked by operators, such as telecommunication companies, to a particular number/line when a device or line is purchased, and users are generally not allowed to use any other number on the device, except by using an Over The Top (OTT) application or a device vendor native application to allow line sharing to be a native feature of the device. Such OTT applications can make line sharing a native feature and typically require authorization for use by the operator. The OTT applications or native applications work in conjunction with an operator's network to achieve the desired functionality. In this case, the service logic to allow line sharing is in the network and is tied to a user's subscription. In contrast to such techniques, the present disclosure provides exemplary multi-device, multi-line systems and methods that provide a relatively easy user experience and reduce a dependency on existing network functions to provide the desired functionality.

Examples of the disclosure are discussed in connection with providing various functions in connection with an IP Multimedia Core Network Subsystem (IMS) network using session-initiation-protocol (SIP). However, unless otherwise noted, the disclosure is not limited to use with such networks and/or protocols, and to the extent compatible, can be used in connection with other communication networks, network architectures, and/or protocols.

Figure 1:
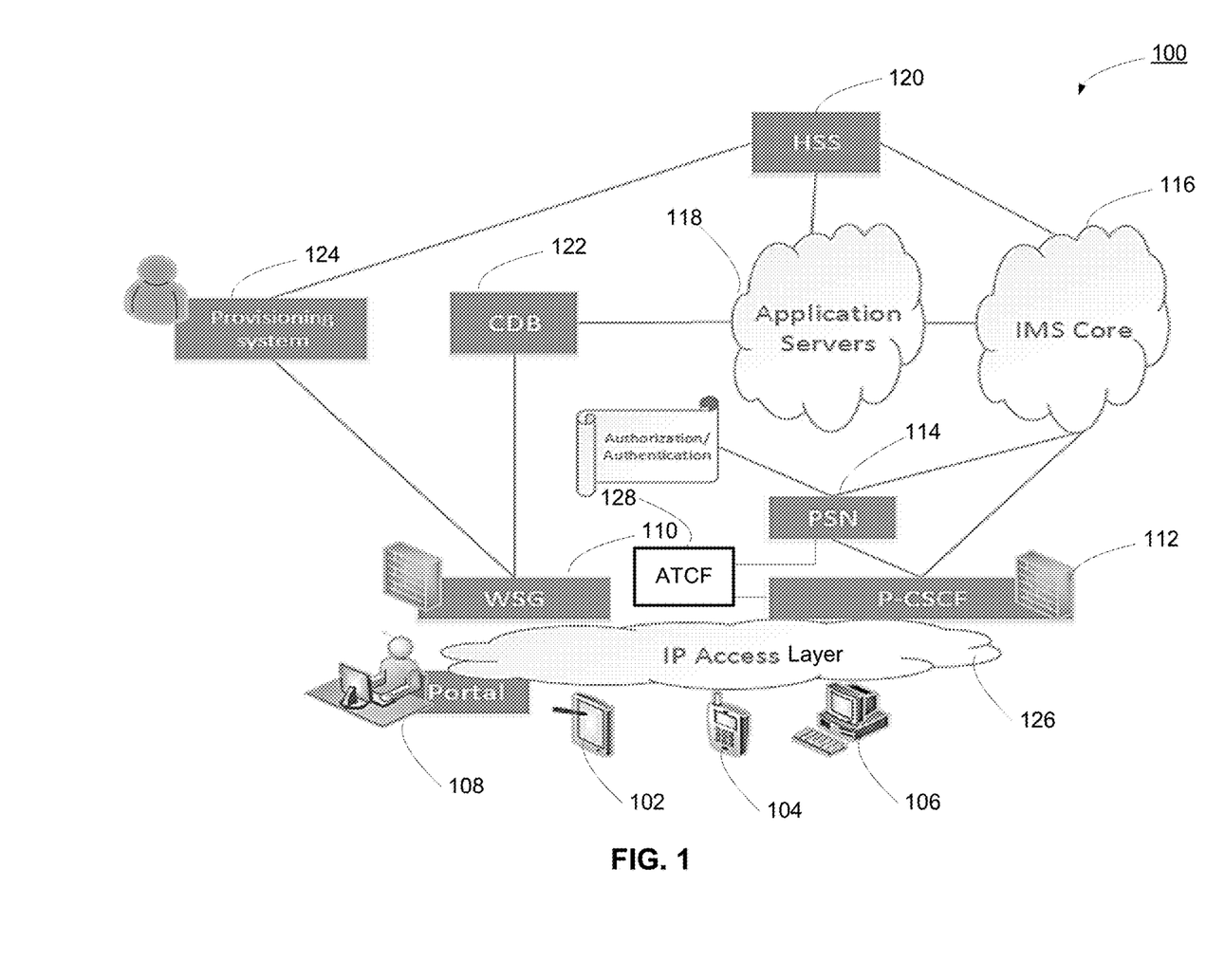
FIG. 1 illustrates a network architecture diagram of an exemplary communication network according to the present disclosure.

Turning now to the figures, FIG. 1 illustrates a network or system 100 that includes user devices or user equipment (UE) 102-106 (also referred to herein as devices), a portal 108 to an IP access layer 126, a web service gateway 110, a contact point (e.g., a P-CSCF) 112, a proxy service node (PSN) 114, an IMS core 116, one or more application servers 118, a home subscriber server (HSS) 120, a converged database (CDB) 122, and a provisioning system 124. As set forth in more detail below, network 100, and in particular, PSN 114 and CDB 122, allow multiple devices (e.g., devices 102-106) to have access to and use multiple lines in a relatively easy manner. In accordance with exemplary embodiments of the disclosure, the line sharing service can be access and/or device agnostic, i.e., any IP access which can support IMS communication, in the illustrated example, can be used by a client and any device which has IP connectivity can use the MLMD service.

User devices, also referred to herein as user equipment (UE), 102-106 can include any suitable device with wired and/or wireless communication features. For example, user devices 102-106 can include a wearable device, a tablet computer, a smart phone, a personal (e.g., laptop) computer, a streaming device, such as a game console or other media streaming device, such as Roku, Amazon Fire TV, or the like, a mobile station, a subscriber station, a mobile unit, a subscriber unit, a wireless unit, a mobile device, a wireless device, a wireless communication device, an access terminal, a mobile terminal, a handset, a user agent, or other suitable device.

In accordance with various embodiments of the disclosure, one or more of devices 102-106 includes a client. As used herein, client can refer to a downloadable OTT application, a native phone application, a soft phone or a browser-based client. The client performs one or more client functions as described herein. For example, the client can include a user interface to display or present multiple lines available for use on a device. Further, the client can allow a user to select a line from the available lines for registration and/or use. The client can also allow a user to enter account information associated with one or more lines that can be used by a network provider, such as a telecommunications company. The client can allow a user to log in to access various system and method features described herein. Additional exemplary client functions are described below.

Portal 108 can include any suitable portal, such as a portal provided by a network (e.g., telecommunications) provider. A user can use portal 108 to gain network access, register devices and/or lines, perform operations related to line sharing, and/or the like.

Web service gateway (WSG) 110 is a network gateway that allows one or more devices to secure network access. WSG 110 can also act as an orchestrator between the operator backend systems and CDB 122 for service-related provisioning. WSG handles records from provisioning system 124 and can interact with CDB 122 or another network node to provision a user to allow a user to use one or more of the MLMD features described herein. For example, WSG can receive information from provisioning system 124 and convert that information to a message format understood by CDB 122, thereby essentially hiding CDB 122 provisioning complexities from an operator's system. Exemplary WSG 110 front-end operations allow a client to create/manage devices sharing one or more lines and to activate/deactivate the line(s) on the device(s). WSG 110 can also support authorization/authentication for line(s) selected by a client—e.g., in association with an operator's backend provisioning node.

In the example illustrated in FIG. 1, a network contact point (e.g., a P-CSCF) 112 is a session-initiation-protocol (SIP) first point of contact with an IMS network. Although illustrated separately, P-CSCF can form part of IMS core 116.

PSN 114 is a network node that enables registration of multiple lines associated with a device. PSN 114 can be a standalone node in the network or may be co-located with a proxy or edge node, e.g., an A-Session Border Controller (A-SBC), Proxy-CSCF (P-CSCF), or Access Transfer Control Function (ATCF) node—e.g., ATCF 128. In accordance with exemplary aspects of the disclosure, PSN 114 is a signaling-only node; however, nothing prevents media anchoring on PSN 114.

As discussed in more detail below, PSN 114 can function as an I-CSCF and can authorize and/or authenticate one or more lines selected by a user (e.g., using a device 102-106 having a suitable client). Once the lines are authorized and/or authenticated, PSN 114 communicates a register message (e.g., a REGISTER request) for each line to IMS core 116.

IMS core 116 can include typical IMS core functions, such as call session control functions. IMS core 116 generally includes an interrogating CSCF (I-CSCF) node and a serving CSCF (S-CSCF) node. The I-CSCF and S-CSCF described herein perform typical I-CSCF and S-CSCF functions.

Application servers 118 can perform a variety of functions. Application servers 118 generally interact with S-CSCF using SIP. Various application servers 118 are described in more detail below.

HSS 120 is a database that supports the IMS network entities that handle communications. HSS 120 can contain, for example, subscription-related information, including phone numbers, billing information, on which nodes users are registered, authentication information, user identity information, and the like. HSS 120 can assist IMS core 116 with routing procedures.

CDB 122 stores service-related data, including line-sharing information. As shared lines are added or removed, the information is stored/updated in CDB 122. The information can be updated on CDB 122 using an operator's provisioning system to update CDB 122. Alternatively, as noted above, WSG 110 can perform front-end operations on behalf of CDB 122. This front-end function can, but need not be co-located with CDB 122. The service data in the CDB are accessible to application servers 118, which are responsible for executing the service logic of the server.

Provisioning system 124 can be a typical operator provisioning system. Provisioning system 124 can be used to assign one or more lines to a user and/or to one or more devices. Provisioning system can use information, such as user identity, user address, and lines associated with a user. Provisioning system 124 can provision a user to, for example, WSG 110, CDB 110, or HSS 120.

With prior IMS-based networks, line sharing is generally done by way of upgrading existing network functions. The lines that are to be shared are put together in an Implicit Registration Set (IRS) in the Home Subscriber Server (HSS) and then the rest of the IMS functions, such as Call Session Control Functions (CSCFs) and Application Servers (AS), work with information stored in the IRS. This architecture relies on existing IMS functions and has several shortcomings. One such shortcoming is that the IRS on HSS is updated whenever a user permits another user to use a line or the user revokes permissions on a shared line. Also, the IRS on the HSS is typically separate for business and personal lines for reasons related to accounting, ownership, management, and the like. Combining information associated with different lines in one IRS is a cumbersome operation, requiring changes in an operator's backend system. Such a process is tedious and error prone when users try to share lines with each other for short periods of time. As a result, operators typically put restrictions on line sharing (e.g., business lines can only be shared with users belonging to same company/business group). This solution may not be attractive to many consumers. Further, such systems generally do not present all available lines to a user to allow the user to view and select an available line from a plurality of available lines—e.g., at the time of actual usage, e.g., presented in a unified message box, using a graphical interface, or the like.

Exemplary systems and networks, such as network 100, include one or more CDB 122 for storing (e.g., all) service data. Also, PSN 114 is provided to authorize and optionally authenticate multiple lines associated with a user and/or device. This allows the MLMD functions described herein, without requiring changes on an HSS (e.g., HSS 120).

In accordance with various examples of the disclosure, a client, registrar (S-CSCF) within IMS core 116 and application servers 118 support Contact bindings based on the instance-id present in a "sip.instance" parameter in the Contact header. The instance-id is a globally unique value that corresponds to a device and can be based on the Information Mobile Station Equipment Identity (IMEI) of the communication device.

An exemplary method of using a network, such as network 100, with SIP, is described below. The method below is conveniently described in connection with using network 100 and SIP. However, various methods in accordance with the disclosure can suitably be used with other networks and/or other protocols.

In accordance with exemplary aspects of the illustrative embodiments, a user registers an IMPU (IMS Public User Identity) in the network (e.g., network 100). Activation of a line on a device corresponds to registering the line in the network. During this process, a user can be presented, via a user interface of a client on a device (e.g., device 102, 104, or 106), a list of available lines, and the user can select, using the client/user interface, which line(s) to be registered for service. At this point of time the client sends a SIP REGISTER request to the network (e.g., to P-CSCF 112). The line(s) selected by the user are put in a SIP header within the REGISTER request. The SIP header is referred to as a P-Multi-Line-Association header, but an existing header or a header under another name can also be expanded to achieve the same functionality. P-CSCF 112 processes the request (e.g., as the P-CSCF would process a typical request), and based on presence of the SIP header carrying selected lines, forwards the request to PSN 114. One way to achieve forwarding the request is to manipulate the outgoing request just before the request is put on wire in a way so as to add a Route header pointing to PSN 114 when the P-Multi-Line-Association header is present in the REGISTER requests. For example, the logic can be built in to the P-CSCF SW or a tool/script that runs on machine hosting P-CSCF can be used. This tool/scripts can intercept an outgoing SIP REGISTER message and instead of sending the message to the I-CSCF, forward the message to PSN 114 based on the information in the header. Alternatively, this routing could be on a per SIP method basis, such that if the P-Multi-Line header is present, then an INVITE is sent to PSN 114 (but the MESSAGE requests are not sent). In this case, the initial/refresh/deregister requests for the service are handled by PSN 114.

At this point, PSN 114 looks like an I-CSCF to P-CSCF 112. PSN 114 then authorizes (and optionally authenticates) the selected lines. Post authorization/authentication, PSN 114 sends multiple REGISTER messages (one for each selected line) towards the Interrogating-CSCF (I-CSCF) 202, illustrated in FIGS. 2 and 3, where PSN 114 acts as the P-CSCF. Because PSN 114 does all of the mapping, mapping information correlating multiple lines need not be stored in IMS core 116.

An exemplary REGISTER request sent by PSN 114 has the following characteristics: the "Path" header in the request is not changed by the PSN 114, so that subsequent terminations are directly sent to P-CSCF 112. If PSN 114 authenticated the user, then PSN 114 adds "integrated-protected" in the Authorization header of REGISTER request to "auth-done" and thus the REGISTER request is not challenged by IMS core 116. PSN 114 does not change the Contact header including the "sip.instance" parameter. If PSN 114 did not authenticate an incoming request, then REGISTER request for the address of record (AoR) being registered by the client is sent first and the rest of the lines are registered upon successful registration of that AoR. The authentication of the AoR in this case can follow a typical IMS authentication procedure, as detailed in 3GPP TS 24.229, the contents of which are hereby incorporated herein by reference, to the extent such contents do not conflict with this disclosure, with PSN 114 in the signaling path. In all subsequent REGISTER requests for remaining lines, PSN 114 adds "integrated-protected" in the Authorization header to "auth-done" so that the REGISTER request is not challenged by IMS core 116. The contents of the P-Multi-Line- Association header can be changed by PSN 114 if any line mentioned therein is not authorized by the network for use. In this case, PSN 114 removes that line from the header and includes the updated header in the REGISTER directed towards IMS core 116, so application servers 118 and IMS core 116 can access the same updated header if desired or required.

Figure 2:
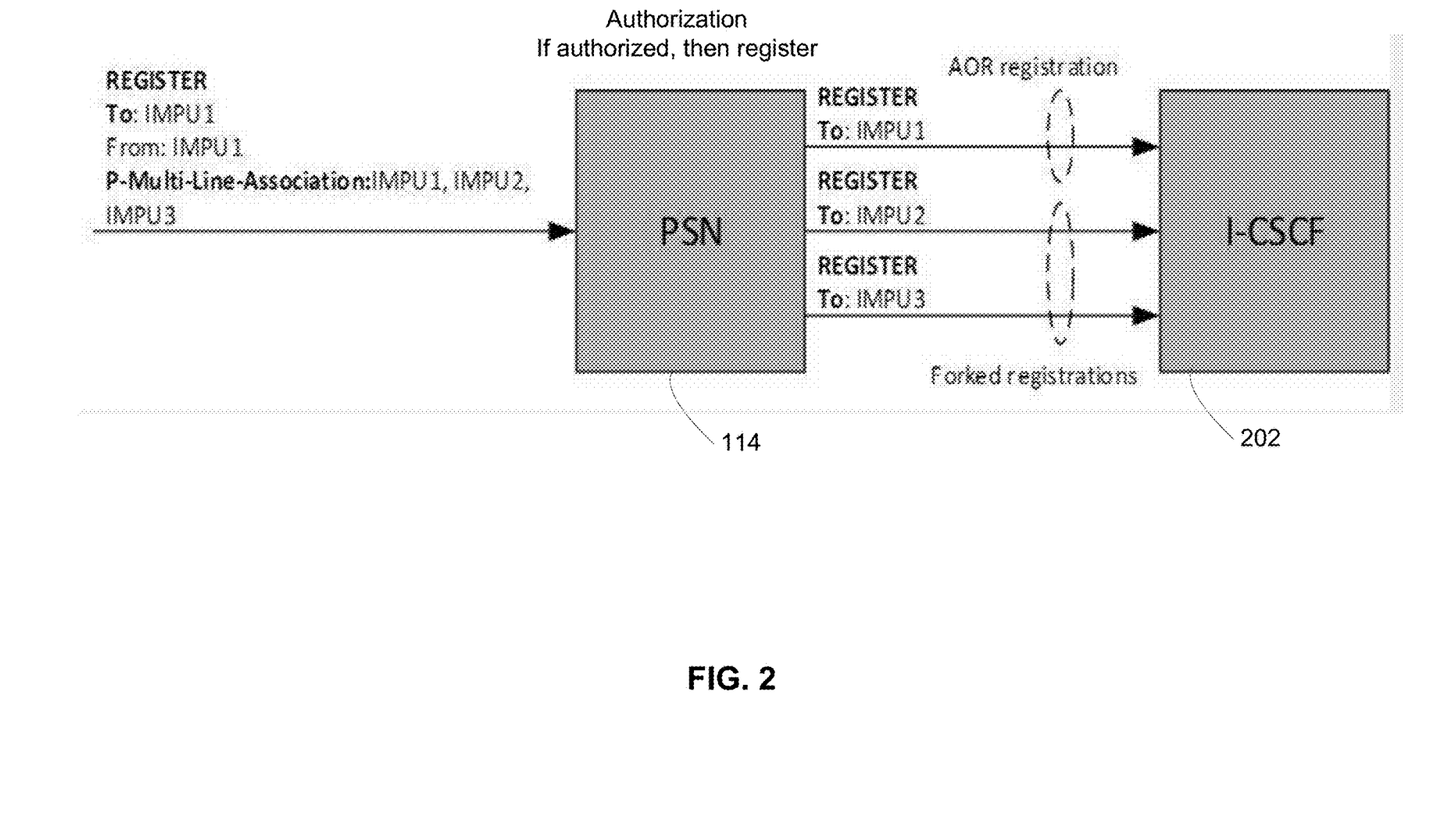
FIG. 2 illustrates a data flow diagram of an exemplary registration fork process according to the present disclosure.
Figure 3:
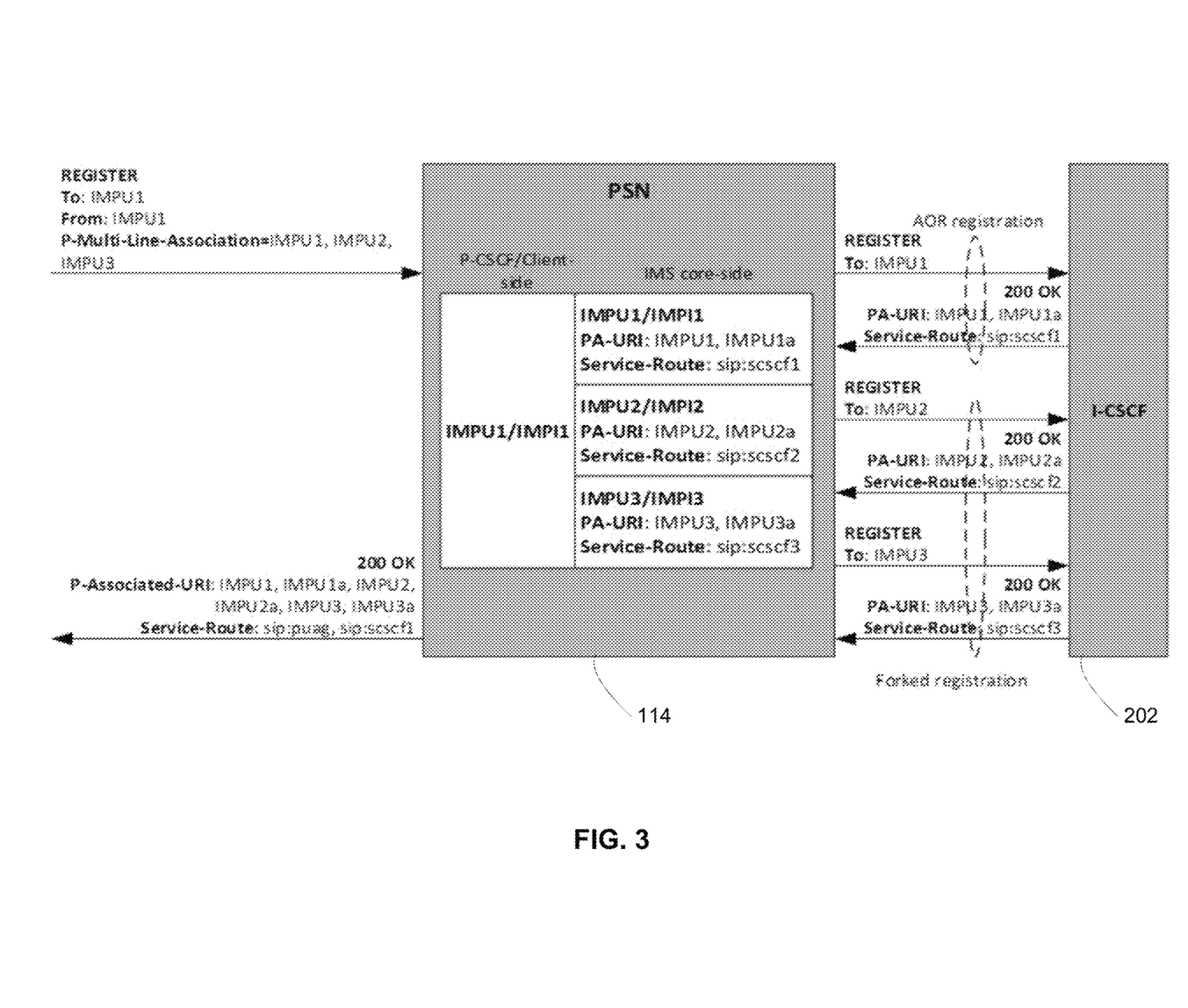
FIG. 3 illustrates a more detailed data flow diagram of an exemplary registration fork process according to the present disclosure.

The procedure to send multiple registrations in this fashion is similar to SIP forking functionality and is referred to herein as registration forking. FIGS. 2 and 3 illustrate registration forking, where a client is registering 3 lines/IMPU (IMPU1, IMPU2 and IMPU3) and one of the lines (IMPU1) is the AoR, and IMS core 116 uses the forked mapping. This AoR in the incoming REGISTER to PSN 114 is considered as Primary Line for the purpose of service logic.

In the illustrated example, PSN 114 waits until all selected lines are registered (e.g., in a SCC AS for the respective lines). Each line may be served by a distinct Serving-CSCF (S-CSCF) and hence different "Service-Route" values may be received in responses. Once PSN 114 receives 200 OK for all REGISTER requests that PSN 114 sent, PSN 114 merges the P-Associated-URI header from all 200 OK responses and then sends a 200 OK response with the consolidated P-Associated-URI header to P-CSCF 112. P-CSCF 112 forwards the response to the client. The Service-Route in the 200 OK response to P-CSCF 112 points to the S-CSCF which registered the AoR selected by the client.

FIG. 3 illustrates aggregation of REGISTER responses at PSN 114. The responses from I-CSCF 202 show multiple IMPUs in the P-Associated-URI header that are aggregated by PSN 114. PSN 114 maintains different bindings towards P-CSCF 112 and IMS core 116, as shown. By not adding itself to the Service-Route header sent to P-CSCF 112, PSN 114 does not remain in the path for any subsequent non-REGISTER requests.

If another user activates the same line, the registration will be served by same S-CSCF and application server 118, because due to prior registration of the same line, an S-CSCF is already assigned to such a line. In other words, all registrations of the same line in network 100 are served by the same S-CSCF and application server 118.

At the end of the activation procedure, PSN 114 is in the path for subsequent registration related signaling, while P-CSCF 112 continues to handle communications, such as voice, video and messaging sessions of the user. All the lines activated (e.g., selected for use) by the user are available for use on the device because of their presence in P-Associated-URI header in the 200 OK response. The 200 OK response from PSN 114 to the P-CSCF 112 contains the PSN URI as the topmost Service-Route header followed by the URI of the S-CSCF serving the AoR. As a result, PSN 114 knows only the S-CSCFs that are serving the forked registrations.

In accordance with various examples of the disclosure, P-CSCF 112 logic is configured such that it sends only the REGISTER messages to PSN 114 and the rest of the SIP requests are routed to the S-CSCF serving the AoR. The service logic related to handling calls and messages is executed in application servers 118 that have access to the data stored in CDB 122. Any change by the user or the operator affecting the service data is stored/updated in CDB 122. Upon receiving a Third Party Registration (TPR) from the S-CSCF, application server(s) 118 can fetch the service data from CDB 122. The service data can contain, for example, but is not limited to: 1) a list of lines which are eligible for service; 2) a list of users to be alerted when a call/message is received for a shared line (this allows presenting the call/message to the user who has activated a shared line; the user here corresponds to a Primary Line); and 3) a list of users (e.g., corresponding to a Primary Line) who are currently using a shared line (i.e., those users who activated one or more shared lines on their devices).

When a user who is using a shared line deactivates the line on a device (e.g., device 102, 104, or 106—e.g., using a user interface), the client sends a refresh REGISTER request with only the active lines in the request. The then active lines are carried in in the same SIP header that was used in the initial registration request. When PSN 114 receives such a REGISTER request from P-CSCF 112, PSN 114 compares the lines present with the lines previously registered by the client. Any currently activated line that is missing in the refresh REGISTER request (i.e., deactivated by the user on a device using a client), PSN 114 de-registers the line by sending a (de)REGISTER request to IMS core 116. For all other (i.e., not deactivated by a user) lines, PSN 114 sends a refresh REGISTER message to IMS core 116.

In accordance with exemplary embodiments of the disclosure, because the user is allowed to use any line activated on a device and the P-CSCF routes all Mobile Originated (MO) requests except REGISTER to the S-CSCF of the AoR, the From or P-Preferred-Identity header in an MO request contains the AoR, and the desired CLI (Calling Number) is placed in a different SIP header. The S-CSCF of the AoR processes the request as usual without knowing the actual CLI. The service logic in the application server 118 serving the AoR checks for the presence of the desired CLI and then replaces the From/P-Asserted-Identity header in the outgoing request with the desired CLI, and forwards the request to the IMS core so that the same can be routed to the AS serving the new CLI where all the services are applied. In summary, the role of the AS serving the AoR is restricted to changing the CLI with the desired line and the actual services are provided by the AS serving the chosen CLI.

Figure 4:
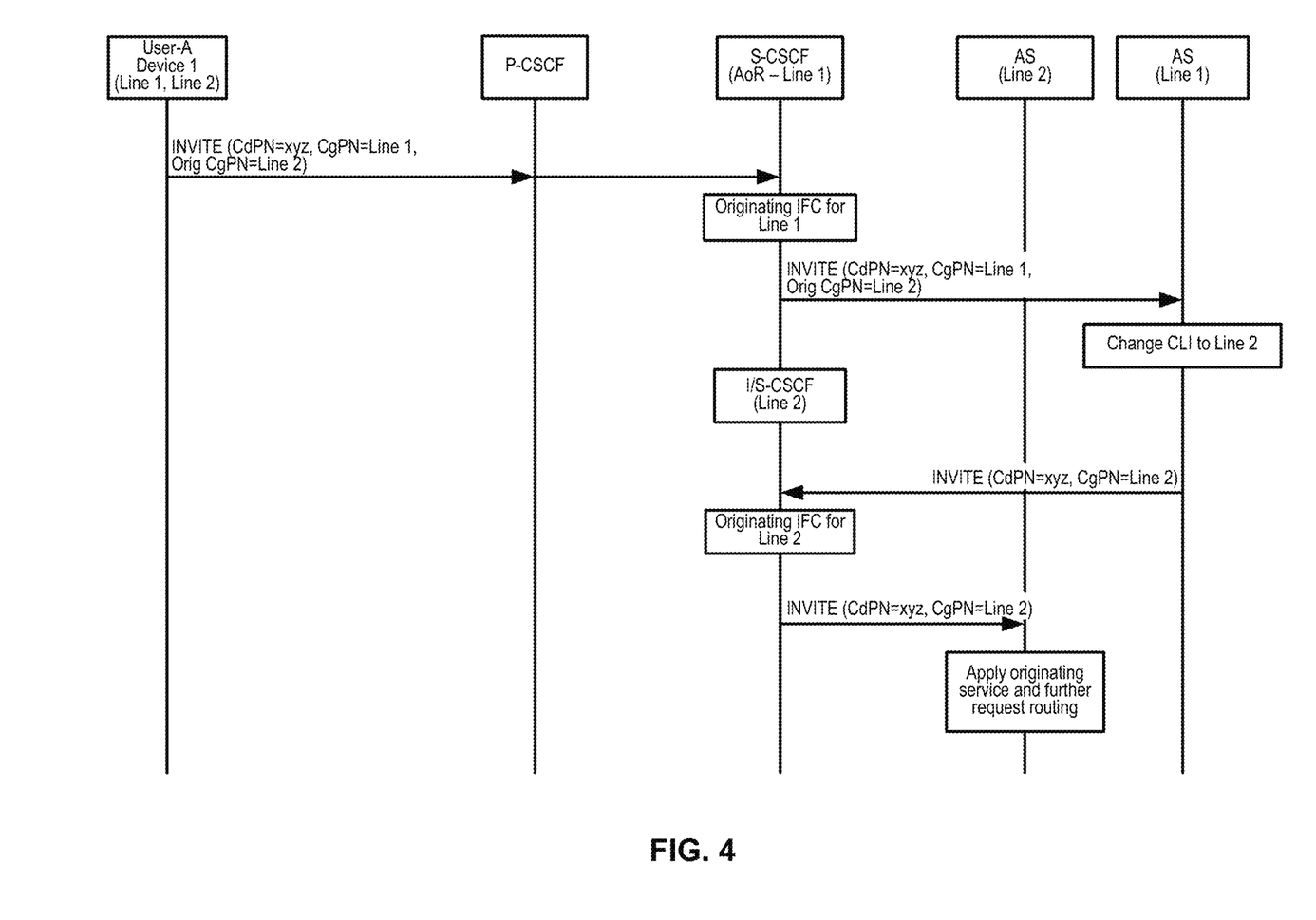
FIG. 4 illustrates a data flow diagram of an exemplary mobile originated request according to the present disclosure.

FIG. 4 illustrates a diagram of an exemplary mobile originated request data flow in accordance with illustrative embodiments of the disclosure. The example is described in the context of a voice call; it can easily be extended to other multi-media services. In the illustrated example, User-A and User-B are owners of Line 1 and Line 2, respectively, and User-B shared Line 2 with User-A. User-A activated Line 2 with Line 1 being the AoR. Subsequently, User-A originates a call and wants to use the calling line as "Line 2." The request is received by application server for line 1 (AS-1) (e.g., one of application servers 118). AS-1, based on "Original Calling party" information in the request, changes the CLI to "Line 2" and the request is routed to application server for line 2 (AS-2) (e.g., another one of application servers 118) through the IMS core (e.g., IMS core 116). Originating services are provided by AS-2, which can be one of application servers 118.

Mobile-terminated (MT) calls or messages for a line can be routed to an AS (e.g., one or application servers 118) using, for example, typical IMS routing procedures over an IMS Service Control (ISC) interface. Because a line may be a shared line, the AS uses information corresponding to devices and/or lines to which the communication should be forwarded. The AS (the application server corresponding to the primary line or the AoR) obtains the line information from the CDB (e.g., CDB 122) and bindings for the devices from third party registrations. One way to identify a device binding is from the "sip.instance" parameter in the Contact header of the embedded REGISTER request received in a third party REGISTER. This collective set of devices/line information gathered in this manner is known as a "target set."

When a line in a "target set" is not served by the same AS (because forked registration may result in different S-CSCF/AS assignment), the SIP requests meant for that line are forwarded to the IMS core (e.g., IMS core 116), so as to reach the AS that is serving the user. The request contains information for the other AS and User to know whether the actual called party is different from the served user indicated in the request, so that a terminating request routing is performed without applying any services for the served user (the services are applied at the AS serving the actual called party).

In this fashion, the request meant for a shared line is presented to different users who activated the line on their devices. A point to note is that in the illustrated architecture, the AS serving the original called party plays the role of an anchor for terminating sessions, applying terminating services, and routing to appropriate instances of the called party, while the AS serving other lines is responsible for routing to appropriate instances of those lines but does not provide terminating services.

Figure 5:
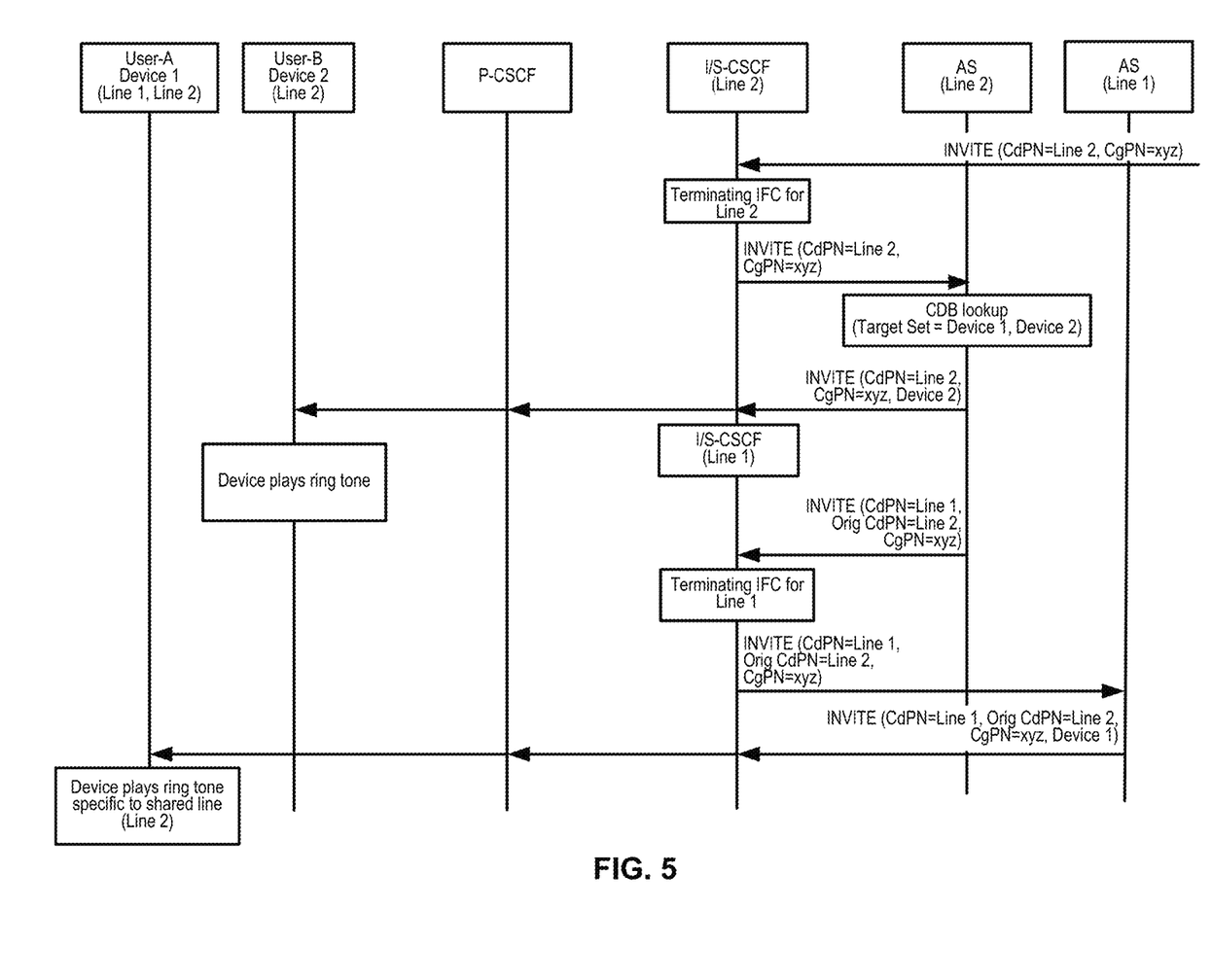
FIG. 5 illustrates a data flow diagram of an exemplary mobile terminated request according to the present disclosure.

FIG. 5 illustrates a diagram of an exemplary mobile terminated request data flow. The example is described in the context of a voice call; it can easily be extended to other multi-media services. In the illustrated example, User-A and User-B are owners of Line 1 and Line 2, respectively, and User-B shared Line 2 with User-A. When a call comes on line 2, both devices will ring. When AS-2 receives an INVITE, AS-2 terminates the invite to User-B's device and also forwards the request to AS-1, so that User-A can also receive the request. The device based on "Actual called party" (line 2) can, if desired, play a distinctive ring tone to let the user know that a shared line (or non-primary line) is being called.

In many cases, it may be desirable to transfer a communication between a packet-switched network and a circuit-switched network. The method described below can be used to transfer a MLMD communication, such as a MLMD communication described above, between network types (e.g., packet-switched and circuit-switched networks).

By way of illustrative example, for networks with Single Radio Voice Call Continuity (SRVCC), when a Long-Term Evolution (LTE) and Circuit-Switched (CS) capable device is engaged in a communication (e.g., a voice call) and moves from an LTE network to a CS access/network, or vice versa, the communication can continue on the device. A line used by a user for the communication (e.g., call) can be either a native line assigned to the device or a shared line. In a 3GPP-defined SRVCC architecture, a Service Centralization and Continuity application server (SCC AS) can be the AS that handles the SRVCC aspects of the communication during and after initial registration of a line. The SCC AS can handle the management of the access transfer of an active session according to 3GPP technical specification TS 23.237, the contents of which are incorporated herein by reference, to the extent such contents do not conflict with the present disclosure. The SCC AS coordinates the proper media and signaling exchange to the access network in which the UE/device is present. A Session Transfer Number (STN-SR) can be used to facilitate that coordination. In this case, an HSS (e.g., HSS 120) can be updated with the STN-SR and exchange SRVCC information with the Access Transfer Control Function (ATCF) at the time of registration. The STN-SR is a unique identifier per subscriber and is stored in the HSS. According to 3GPP Release 10 and later, the STN-SR identifies ATCF and SRVCC information sent by SCC AS and includes its own identifier (ATU-STI). According to 3GPP technical specification TS 23.003, the contents of which are hereby incorporated herein, to the extent such contents do not conflict with the present disclosure, the STN-SR follows the E.164 telecommunications number format and is used by the MSC server for session transfer of the media path from the PS domain to the CS Domain. According to TS 23.237, the STN-SR is configured for an SRVCC subscriber at the time of service provisioning.

With typical network architecture, the AoR and forked registrations by PSN 114, as described above, could go to different SCC AS, which, according to standard functioning of a SCC AS, would result in multiple HSS updates and SRVCC information exchange with the ATCF. In contrast, according to various examples of the disclosure, the SRVCC procedure in MLMD service architecture is based on a line subscribed by the user (or the native line assigned to the UE) and not the shared line, because the native line subscription is known to the EPC network. Various examples of the disclosure provide enhanced registration and call processing procedures related to MLMD service to cover SRVCC.

Exemplary systems and methods in accordance with the disclosure allow service continuity to be achieved through the registration path of a native line irrespective of whether the communication (e.g., voice call) involves the native line. In accordance with exemplary embodiments described herein, an AS of a native line is involved in any MO voice call path, even though the actual calling line preferred by the user is or may be different. The Service Centralization and Continuity Application Server (SCC AS or AS) of the native line (AoR line or AoR primary line) can be involved in the MT call path for Single Radio-Voice Call Continuity (SRVCC). The description provided below provides various ways to achieve SRVCC with MLMD devices, systems, and methods.

Figure 6:
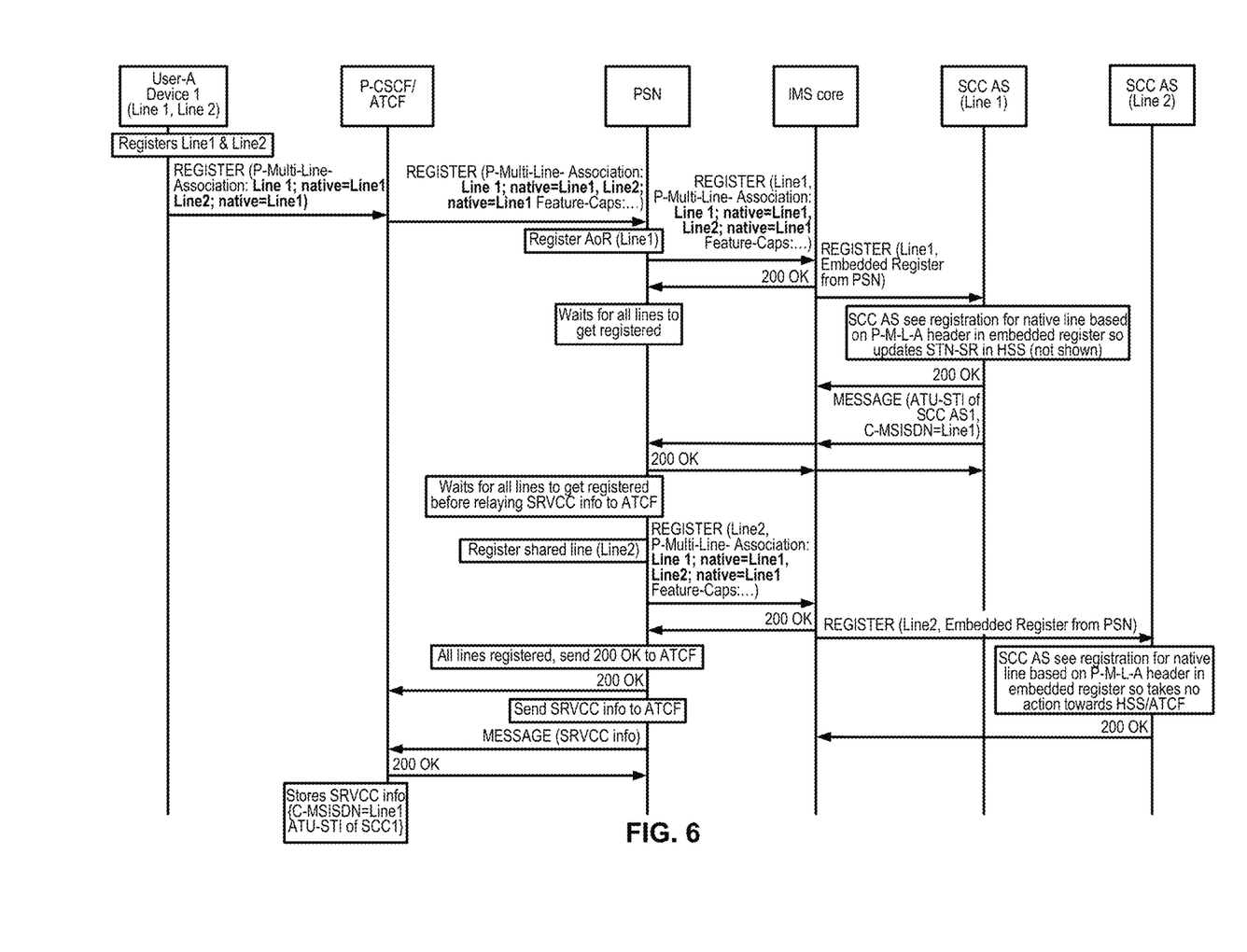
FIG. 6 illustrates a data flow diagram of an exemplary multi-line registration request according to the present disclosure.

FIG. 6 illustrates a data flow diagram of an exemplary multi-line registration request according to the present disclosure. The method illustrated in FIG. 6 includes a PSN (e.g., PSN 114) and an SCC-AS (e.g., an application server 118) to enable communication handoffs between PS and CS networks. The method illustrated in FIG. 6 can be performed each time a user activates or deactivates a line—e.g., using the client and methods described herein. The non-primary/native lines can be automatically deactivated—e.g., each time a device is turned on or off and/or loses a connection to a network, or the non-primary/native lines can be maintained as active, until deactivated by a user using the client.

As illustrated, the process begins by using a client to register a plurality of lines (e.g., lines 1 and 2, where line 1 is the native line—e.g., the line associated with the AoR) associated with a user device. An initial communication is sent from a client (e.g., the client described above) to P-CSCF/ATCF, which forwards the communication to a PSN (e.g., PSN 114). The PSN communicates with an IMS core (e.g., IMS core 116) to register each of the (e.g., selected) lines for a user device. At this stage, the PSN waits for each line to be registered with a respective SCC AS for each line and receives an acknowledgement (e.g., 200 OK) that the lines have been registered.

As illustrated, service logic of an application server (e.g., an SCC AS, which can be one of AS 118) enhances the P-Multi-Line-Association header used at the time of registration to include the native line identification, such that the native line assigned to the device is included in the header along with all permissioned lines. For example, the header can be: P-Multi-Line-Association: IMPU1;

native=MSISDN1, IMPU2;native=MSISDN1, where MSISDN1 is the native line assigned to the device. The service logic further includes logic to avoid multiple STN-SR updates in an HSS (e.g., HSS 120) and SRVCC information exchange with ATCFs through a different SCC AS. Enhancements in SCC AS may be made to check the P-Multi-Line-Association header (in the embedded REGISTER message) upon receiving a third party registration, and determine whether the Line/IMPU being registered is the same as the native line of the device—or not. If not, the SCC AS suppresses the STN-SR update in the HSS and sends the SRVCC information to the ATCF. The SCC AS may or may not send a failure response to the third party REGISTER. Alternatively, initial filter criteria (IFCs) can be configured in such a way that a failure response doesn't result in network initiated de-registration at the S-CSCF. The PSN (e.g., PSN 114), when sending forked registration for shared lines, includes a parameter (in any existing or in P-Multi-Line-Association SIP header) that is validated by the IFC, and if Service Point Trigger (SPT) is matched, the third party registration to SCC AS is skipped. In this way, only the SCC AS of the native line of the device receives a third party register request from the S-CSCF.

Exemplary embodiments of the disclosure ensure that during a registration request, the HSS is updated only once for the native line of the device, and not for any shared line active on the device. The STN-SR available to the MME through the HSS would identify the ATCF that would serve or anchor the voice sessions of the native line of the device. This will also ensure that only one SIP MESSAGE carrying the SRVCC information is sent to the ATCF (through the PSN) when there could be potentially more than one SCC-AS involved (combined AoR and forked registration paths). This can be achieved by PSN 114 replacing the ATCF URI in the path header with its own URI in the forked REGISTER messages, so that the SIP MESSAGE sent by SCC-AS is routed to PSN 114. PSN 114 then sends the SIP MESSAGE to the ATCF using the original ATCF URI that was replaced.

In accordance with the illustrated example, the PSN receives only one SIP MESSAGE. The PSN relays the same to ATCF with no change in the SRVCC information.

Figure 7:
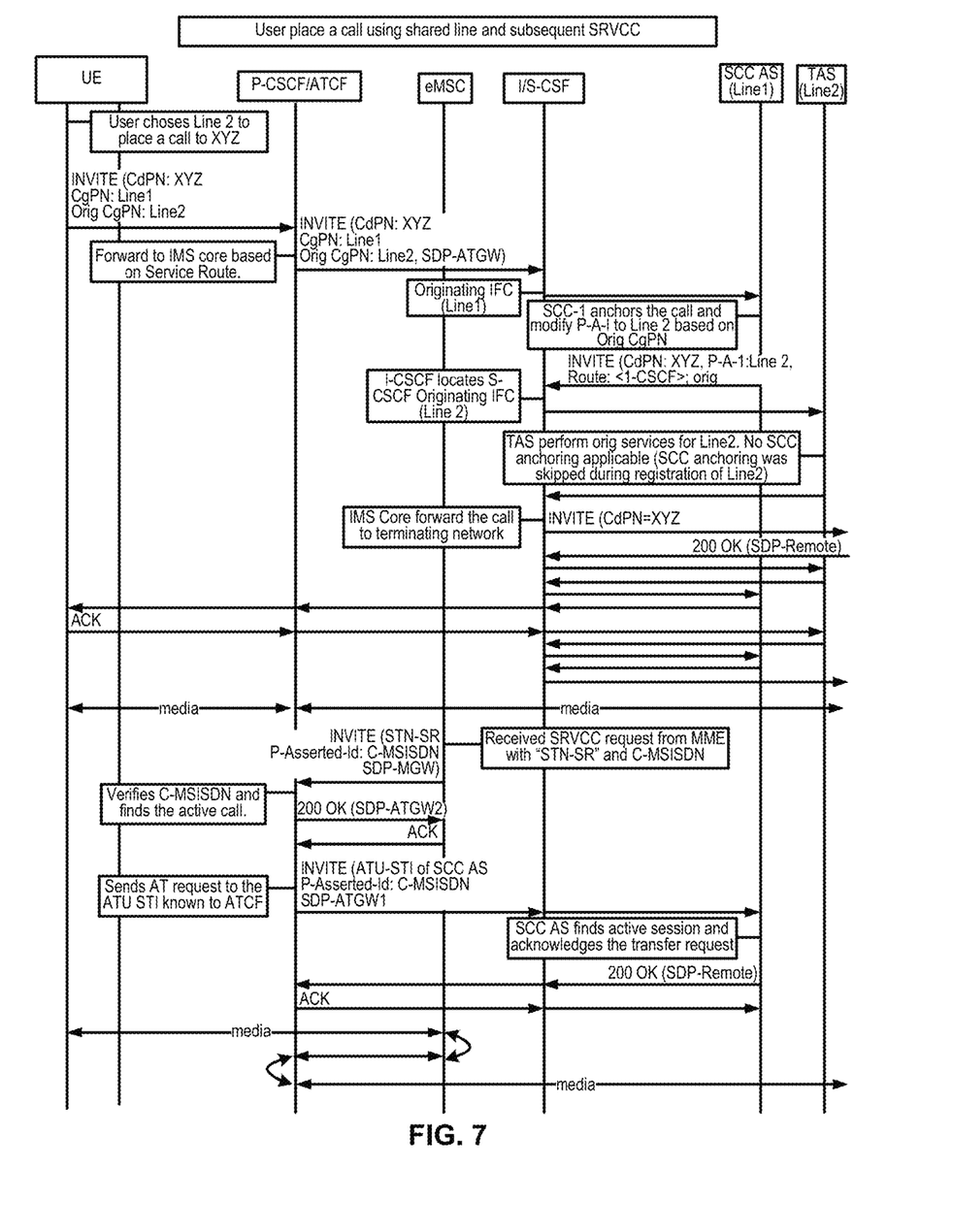
FIG. 7 illustrates a data flow diagram of an exemplary mobile originated request and subsequent SRVCC according to the present disclosure.

FIG. 7 illustrates a data flow diagram of an exemplary method of handing off a communication from a PS to a CS network—e.g., from mobile originated request and subsequent SRVCC according to embodiments of the present disclosure. In the illustrated example, once a plurality of lines is registered, a call can be placed using a selected line. The example illustrated in FIG. 7 corresponds to a user selecting line 2 (a non-primary/native line). Once a user selects line 2, line 1 associated with the user is used to hand over calls from the PS network to the CS network. The SCC AS associates the call on line 2 with line 1 to allow the call handoff between network types. The IMS core and P-CSCF/ATCF treat the communication as a communication from line 1, until the SCC AS changes the calling party from line 1 to line 2.

For access transfer to be successful, the communication (e.g., voice call) made using any shared line on a device is anchored on SCC-AS serving the native line (the access transfer is also handled by the same SCC AS).

Figure 8:
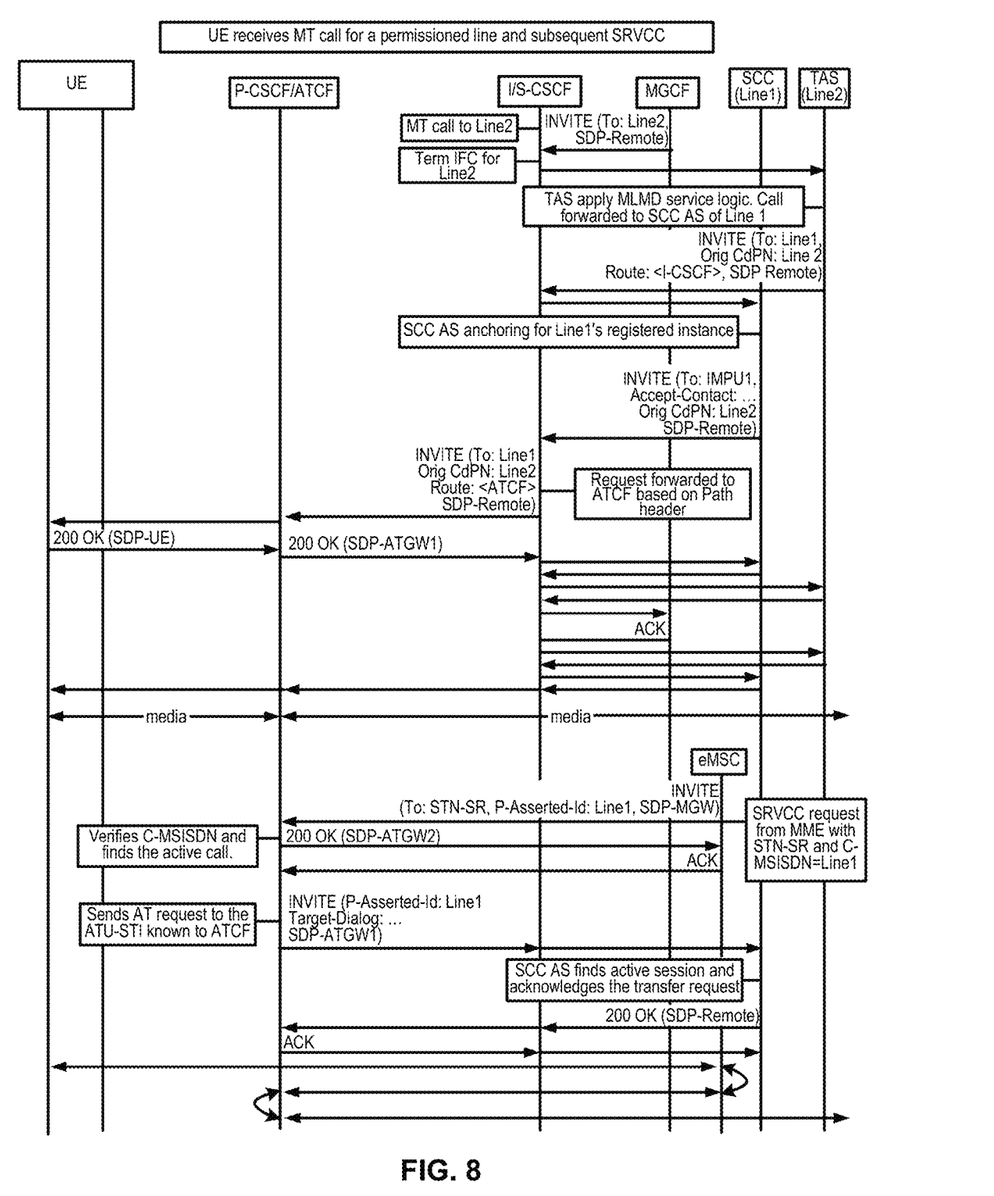
FIG. 8 illustrates a data flow diagram of an exemplary mobile terminated request and subsequent SRVCC according to the present disclosure.

FIG. 8 illustrates a call flow diagram where a call for shared line (line 2) is presented to the user and later the same call is transferred to CS access. In the illustrated example, an MGCF sends an INVITE to an I/S-CSCF, which then sends the request to telephony application server (TAS). TAS forwards the call to SCC AS for line 1 to anchor line 1. The communication goes back to the IMS core (I/S-CSCF) and then terminates the call—e.g., using standard protocols.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A method comprising:
    using a device, presenting to a user one or more lines available for service;
    receiving from a client, at a network contact point, information corresponding to one or more lines selected for service;
    sending, from the network contact point, a request with information corresponding to the one or more lines selected for service;
    receiving, at a proxy service node, the request with the information corresponding to the one or more lines selected for service; and
    sending, from the proxy service node, a plurality of register messages, wherein each register message is associated with one of the one or more lines selected for service.

2. The method of claim 1, wherein the network contact point comprises a P-CSCF.

3. The method of claim 1, wherein the step of sending comprises sending the plurality of messages to an I-CSCF.

4. The method of claim 1, further comprising a step of receiving, by the proxy service node, a plurality of response messages, wherein each response message corresponds to a register message.

5. The method of claim 4, further comprising a step of aggregating the plurality of response messages.

6. The method of claim 5, wherein the proxy service node performs the step of aggregating.

7. The method of claim 5, further comprising a step of sending a register response message from the proxy service node to the network contact point.

8. The method of claim 1, further comprising a step of registering a plurality of lines with one or more devices.

9. The method of claim 1, further comprising a step of storing line-sharing information in a converged database.

10. A system comprising:
    a user interface for presenting to a user one or more lines available for service and allowing the user to select one or more selected lines from the one or more lines available for service;
    a network contact point that receives information corresponding to the one or more selected lines and for sending a register request with a new or existing header indicating the one or more selected lines; and
    a proxy service node for receiving the register request.

11. The system of claim 10, wherein the proxy service node authorizes the selected lines.

12. The system of claim 10, wherein the proxy service node authenticates the selected lines.

13. The system of claim 10, wherein the proxy service node sends a register message for each of the one or more selected lines.

14. The system of claim 10, wherein if the proxy service node did not authenticate an incoming request, then the proxy service node registers an address of record before registering other lines associated with the address of record.

15. The system of claim 10, wherein the proxy service node adds an indication to a header to indicate that one or more lines are authorized.

16. The system of claim 10, wherein the proxy service node performs registration forking.

17. The system of claim 10, wherein the proxy service node waits for a register response in connection with each line and then sends a response with consolidated line information to the network contact point.

18. The system of claim 10, further comprising a converged database to store and update line-sharing information.

19. A communication method comprising the steps of:
using a client on a device, presenting to a user one or more available lines for service; using the device, selecting one or more lines associated with the device;
receiving, at a proxy service node, a request including information associated with a plurality of lines; and
sending, from the proxy service node, a plurality of register messages, wherein each register message corresponds to a line.

20. The communication method of claim 19, further comprising a step of aggregating a plurality of response messages by the proxy service node.

* * * * *

UNITED STATES PATENT AND TRADEMARK OFFICE
CERTIFICATE OF CORRECTION

Page 1 of 1

PATENT NO. : 9,906,616 B2
APPLICATION NO. : 14/992791
DATED : February 27, 2018
INVENTOR(S) : Anish Sharma et al.

It is certified that error appears in the above-identified patent and that said Letters Patent is hereby corrected as shown below:

On the Title Page

Please list the following (72) Inventors as named below:
Anish Sharma, TX
Michael Brett Wallis, TX
Bejoy Pankajakshan, TX
Shelby Seward, TX
Robert F. Piscopo, Jr., TX Signed and Sealed this
Twenty-second Day of September, 2020

Andrei Iancu
*Director of the United States Patent and Trademark Office*